Dec. 1, 1959  H. O. LEIPOLD ET AL  2,915,615
ELECTRIC HEATING UNIT WITH CONTROL THERMOSTAT
Filed Sept. 9, 1957

INVENTORS
HERBERT O. LEIPOLD.
EMIL C. EVANCICH
BY Eugene C. Knoblock
ATTORNEY

United States Patent Office 2,915,615
Patented Dec. 1, 1959

2,915,615

ELECTRIC HEATING UNIT WITH CONTROL THERMOSTAT

Herbert O. Leipold, South Bend, and Emil C. Evancich, New Carlisle, Ind., assignors to Welcraft Products Co., Inc., New Carlisle, Ind., a corporation of Indiana Application September 9, 1957, Serial No. 682,832

6 Claims. (Cl. 219—46)

This invention relates to an electric heating unit with control thermostat, and more particularly to a heating unit of the strip type adapted to be wrapped around or otherwise applied to an object to heat the same. One of the primary uses of such heating units is to protect exposed liquid conduits by wrapping the same around exposed portions of such conduits.

The primary object of this invention is to provide a novel, simple, inexpensive unit of this character employing a tape as a carrier for a plurality of resistance members so as to maintain predetermined spacing of said members during use to facilitate handling and application of the unit, and having a thermostat protected from the heat of the resistance members.

A further object is to provide a device of this character having a plurality of heating elements carried by a tape in spaced relation and connected in series within electrically insulating means, wherein one of said resistance elements has a thermostatic switch interposed therein and wherein the other resistance member or members include low resistance portions adjacent to said thermostat, whereby to render said thermostat sensitive to the temperature of the member to which the heating unit is applied and substantially insensitive to the heat generated by the heating unit.

A further object is to provide a device of this character having a tape mounting a plurality of electrical resistance elements, wherein one of said resistance elements has a thermostatic control switch interposed therein, and the adjacent portions of the other elements which are connected in series with the thermostat mounting element have low resistance elements placed therein adjacent to said thermostatic switch, and wherein said thermostatic and low resistance elements are confined within a sheath sealed at its ends to said tape and providing an electrical insulation and moisture repellent enclosure for said thermostatic switch and low resistance members.

Other objects will be apparent from the following specification.

Figure 4:
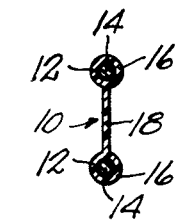
Fig. 4 is a transverse sectional view taken on line 4—4 of Fig. 2.

Referring to the drawing which illustrates the preferred embodiment of the invention, the numeral 10 designates a heating element which preferably is elongated and of the cross-sectional shape illustrated in Fig. 4. The band or tape 10 comprises a pair of resistance wire or heating units of any suitable character and preferably consists of high resistance wires 12 wrapped helically around a core 14 formed of flexible material, such as multiple filament non-conductive material such as threads, glass fibers or the like. Two or more of such resistance elements are arranged in spaced parallel relation, being imbedded within a flexible electrically insulating material, such as a thermoplastic coating. A vinyl type resin has been found particularly well suited for this service. The coating or sheath portions 16 enclosing the resistance elements are preferably connected by a web or band portion 18 of the same material, thus producing a unitary assembly. The material is particularly well suited for production by the extrusion process well understood in the art.

Figure 1:
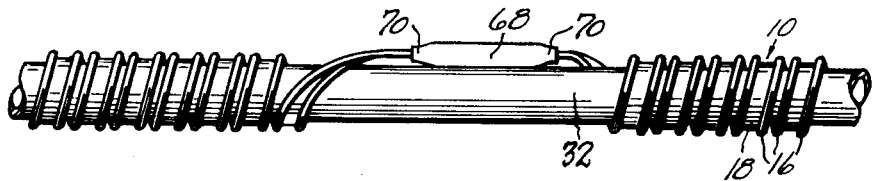
Fig. 1 is a view illustrating the device applied to a conduit in use, said view being a fragmentary elevational view.

At one end of the band 10 the web 18 thereof is preferably cut away at 20 spaced from the ends of the portions 16. The electrical resistance wires 12 project from the insulation sheath 16 at said ends, and each thereof is joined or connected electrically to an electrical conductor 22 as by means of a mechanical electrical connector 24 or by means of solder or any other means found suitable. The conductors 22 project from and are bared at the ends of insulation sheaths 26 which preferably are interconnected at 28 to constitute a unitary two-wire insulated flexible electrical conductor of the type well understood in the art, and to which a suitable electrical plug connector (not shown) may be connected at its free end to facilitate separable electrical connection with an electrical power circuit. It will be understood that the conductors 22 of the lead 26, 28 are of low resistance. A sleeve 30 formed of electrically insulating material encircles the bare portions of the wires 12 and 22 and is suitably joined to the insulations 16 and 26, respectively, therefor. The sleeves 30 are preferably formed of thermoplastic material, such as a vinyl resin, which can be heat sealed or bonded to the insulations 16 and 26 of the connected wires. The sleeves 30 are preferably formed of a vinyl resin of thin wall section to render the same flexible and accommodate bending thereof and of the contained wires incident to wrapping of the unit around an object to be heated, such as a liquid conduit 32, as illustrated in Fig. 1.

Figure 2:
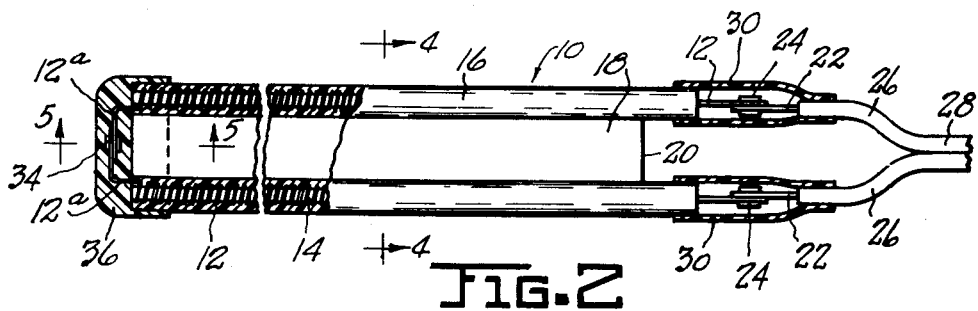
Fig. 2 is a fragmentary plan view of the device with parts shown in section.
Figure 5:
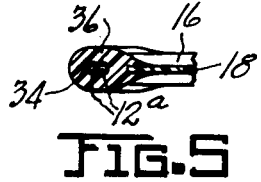
Fig. 5 is a fragmentary longitudinal sectional view taken on line 5—5 of Fig. 2.

The resistance elements 12 housed within a single band or strap or tape are connected in series. One method of connecting such resistance elements is illustrated in Figs. 2 and 5. As illustrated at the left-hand side of Fig. 2, the insulation covering 16 and 18 is stripped from a portion of the resistance wires 12 to provide bared ends 12a of adjacent resistance wires 12. The length of the wire so bared is sufficient to bring the bared wires into contact with each other and to connect the same by a clip or other connector 34. The end of the unit 10 having the projecting electrical conductors 12a connected at 34 is then covered with electrically insulating material 36. This material may constitute a thermoplastic electrically insulating material such as a vinyl resin. The material 36 may be applied or formed on the member 10 by dipping the member 10 within a body of heated thermoplastic material to coat the wires 12 and the connector 34 or by heat sealing a plastic part on parts 16 and 18.

Figure 3:
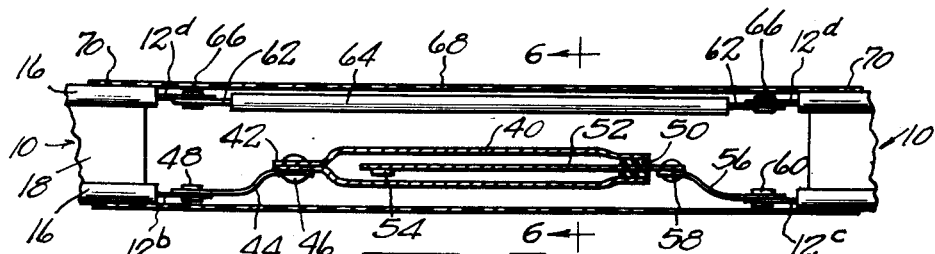
Fig. 3 is a longitudinal sectional fragmentary view taken on line 3—3 of Fig. 6.
Figure 6:
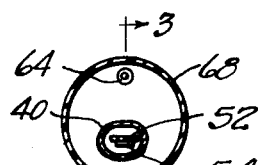
Fig. 6 is a transverse sectional view taken on line 6—6 of Fig. 3.

It is usually desirable in a heating element of this character to control the operation thereof in response to the temperature of the item being heated. For this purpose the thermostatic switch is interposed in one of the electrical resistance elements 12, as illustrated in Figs. 3 and 6. The thermostat preferably constitutes a tubular conductor 40 formed of metal, preferably crimped at one end 42 thereof at which a low resistance electrical lead 44 is connected by any suitable connector means 46, such as a clamp, eyelet, rivet, solder or the like. The conductor 44 is in turn connected to portion 12b of the heating element by connector means 48, such as a clamp or solder. The end of the tube opposite the end portion 42 has a plug 50 of insulating material inserted therein and mounting one end of an elongated bimetallic strip 52 which extends lengthwise in the tube 40 for the major portion of the length thereof and which has a conductive tip 54 at its free end. The bimetallic member 52 will be flexed when cold to cause contact tip 54 to engage the tube 40 and thus close a circuit between said parts. The member 52 is normally in a straight condition as shown in Fig. 3 when the temperature exceeds a predetermined dangerous low value. Consequently, the switch 40, 52 is normally open and closes to make the circuit in which it is connected when a freezing temperature occurs. The end of the bimetallic strip 52 which projects from the tube 40 has a low resistance electrical conductor 56 connected thereto by connector 58, and in turn is connected by a connector 60 to the bared resistance element 12c. It will be apparent, therefore, that when resistance elements 12 of the strip 10 are connected in series and the thermostat switch 40, 52 is interposed in one of such resistance elements, the operating temperature of the unit will be controlled by that switch.

In order that the device may operate properly by sensing the temperature of the element to be heated rather than by sensing its own temperature, it is important that the heating element or elements, and particularly those in other runs than that in which the thermostat is connected, shall not heat the thermostat. A construction as illustrated in Fig. 3 can be employed for this purpose. This construction entails the severing of the resistance elements in the runs thereof different from the run in which the thermostat is connected at points adjacent to the thermostat and the connection thereto of a low resistance electrical conductor. As here shown, the severed ends 12b of the run of the resistance element different from that in which the thermostat is connected are bared or exposed and have connected thereto the bared ends 62 of an electrical conductor having an insulation sheath 64. The wires 12d and 62 are suitably connected electrically at 66 by clamp means, solder, or the like. The bared portions 12d and 62 of wire are preferably of short length, as are also the lengths of the bared resistance wire ends 12b and 12c and the conductors 44 and 56 associated with the thermostat. Consequently, any contact between the parts in the separate runs will occur at the insulation 64 so that short-circuiting is avoided.

The thermostat 40 and the low resistance wire 62 and the bared wire portions associated therewith are encased within a flexible tube of electrical insulating material, such as a thin walled vinyl resin tube 68. The ends of the tube are pressed and heat-sealed at 70 to join them to the parts 16, 18 of the heating unit strip in a manner to seal the tube and thus exclude moisture from the interior of the tube. The tube 68 will preferably have a low heat insulating property so that it responds to or transmits therethrough the temperature of the member 32 which it contacts, and thus renders the thermostat 40 readily responsive to the temperature of said member 32.

In use the strip is connected to a source of electrical current through the lead-in wire 28 thereof and is then applied to the object to be warmed in any suitable manner. In cases where the tubing 32 is to be heated, the member is wrapped spirally around the tubing, as illustrated in Fig. 1. The unit is particularly well suited for protecting exposed water pipes from freezing. It is also suitable for use in connection with poultry fountains, livestock watering tanks, gutters and downspouts. Other uses for which it is well suited are to heat the soil of hot beds, to heat dog houses, to de-ice concrete driveways, or to safeguard porch steps and walks during the winter. In each of these uses, it is totally moisture resistant and electrically insulated so that no damage can occur in its use.

While the preferred embodiment of the invention has been illustrated, it will be understood that changes in the construction may be made within the scope of the appended claims without departing from the spirit of the invention.

We claim:

1. An electrical heating unit comprising an elongated flexible tape formed of insulating material, a plurality of elongated resistance heating elements imbedded in said tape in spaced relation alongside each other, means connecting said heating elements in series, electrical leads for connecting said heating elements with a source of electrical energy, a thermostatic switch interposed in one heating element intermediate the length thereof, a low resistance conductor interposed in the other heating element adjacent to said thermostatic switch, insulation means protecting said switch and low resistance conductor, and a second insulation carried by said low resistance conductor alongside said thermostatic switch.

2. An electrical heating unit comprising an elongated flexible tape formed of insulating material, a plurality of elongated resistance heating elements imbedded in said tape in spaced relation, means connecting said heating elements in series, electrical leads for connecting said heating elements with a source of electrical energy, a thermostatic switch interposed in one heating element intermediate its length, a low resistance conductor interposed in the other heating element adjacent to said thermostatic switch and including an insulation covering for the major part thereof, and a flexible tube encasing said thermostatic switch and low resistance conductor and connected to said tape at its ends.

3. An electrical heating unit as defined in claim 2, wherein said tube is sealed at its ends.

4. An electrical heating unit as defined in claim 2, wherein said tape and tube are formed of thermoplastic material and are bonded together.

5. An electric heater comprising an elongated flexible electrically insulated unit adapted to engage an item to be heated thereby, said unit including a plurality of elongated substantially longitudinal resistance heating elements imbedded in spaced relation in flexible insulating means, a spacer web joined integrally to and being of the same material as said insulating means, means connecting said heating elements in series, electric leads for connecting said heating elements with a source of electrical energy, a thermostatic switch interposed in one heating element intermediate its length, and a low resistance electrical conductor interposed in the other heating element alongside said thermostatic switch.

6. An electric heater comprising a plurality of elongated electric resistance heating elements in spaced relation in elongated flexible insulating sheaths, spacer means joined integrally to and being of the same material as said sheaths, means connecting said heating elements in series, means for detachably connecting said heating elements with a source of electrical energy, an electrically insulated thermostatic switch interposed in one heating element intermediate its length, and an electrically insulated low resistance electric conductor interposed in the other heating element alongside said thermostat.

References Cited in the file of this patent

UNITED STATES PATENTS

| | | |
|---|---|---|
| 1,809,714 | Mathews | June 9, 1931 |
| 1,936,391 | Harrower | Nov. 21, 1933 |
| 2,101,445 | Moore | Dec. 7, 1937 |
| 2,250,325 | Barnes | July 22, 1941 |
| 2,403,803 | Kearsley | July 9, 1946 |
| 2,421,953 | MacKendrick | June 10, 1947 |
| 2,585,443 | Cox | Feb. 12, 1952 |
| 2,824,209 | Leipold | Feb. 18, 1958 |